United States Patent

Bolenbaugh et al.

Patent Number: 4,566,564
Date of Patent: Jan. 28, 1986

[54] DISC BRAKE ASSEMBLY

[75] Inventors: Daniel L. Bolenbaugh; Robert E. Herzog, both of South Bend, Ind.

[73] Assignee: Allied Corporation, Morristown, N.J.

[21] Appl. No.: 638,793

[22] Filed: Aug. 8, 1984

Related U.S. Application Data

[63] Continuation of Ser. No. 383,663, Jun. 1, 1982, abandoned.

[51] Int. Cl.⁴ .............................................. F16D 65/02
[52] U.S. Cl. ................................ 188/73.33; 188/73.1; 188/73.31
[58] Field of Search ............... 188/73.32, 73.33, 73.39, 188/73.43, 73.45, 73.1, 250 B, 73.31

[56] References Cited

U.S. PATENT DOCUMENTS

| | | | |
|---|---|---|---|
| 3,525,420 | 8/1970 | Honick et al. | 188/73.32 X |
| 3,942,612 | 3/1976 | Marchand et al. | 188/73.33 |
| 3,983,969 | 10/1976 | Colpoert et al. | 188/73.33 |
| 3,997,034 | 12/1976 | Kellogg | 188/73.45 |
| 3,998,296 | 12/1976 | James | 188/73.43 X |
| 4,099,600 | 7/1978 | Temperley et al. | 188/73.39 |
| 4,136,761 | 1/1979 | Burgdorf et al. | 188/73.43 |
| 4,174,769 | 11/1979 | Gerard | 188/73.32 |
| 4,313,527 | 2/1982 | Pickel | 188/73.1 X |

Primary Examiner—George E. A. Halvosa
Attorney, Agent, or Firm—Ronald D. Welch; Ken C. Decker

[57] ABSTRACT

A disc brake assembly includes a torque member (12) with a pair of arms (18, 20) supporting a caliper assembly (24). The pair of arms and caliper assembly define recesses (34, 36) and the recesses form slots (50, 52) which receive a friction element (32). The friction element (32) extends into the recesses (34, 36) to connect with and transmit torque to the caliper assembly (24). The friction element 32 includes projections (62, 64) in abutting relation with the caliper assembly (24).

2 Claims, 5 Drawing Figures

DISC BRAKE ASSEMBLY

This is a continuation of application Ser. No. 383,663 filed June 1, 1982, now abandoned.

This invention relates to a disc brake assembly, and, more particularly, to a "rail slider" disc brake wherein a pair of torque member arms movably support a caliper assembly.

A disc brake assembly comprises a torque member fixedly disposed adjacent a rotor to be braked and including a pair of arms extending axially over the periphery of the rotor, a caliper assembly movably carried by the pair of arms and cooperating with a pair of friction elements to urge the latter into engagement with the rotor during braking, and the caliper assembly including a pair of axially extending grooves for receiving the pair of arms.

In U.S. Pat. No. 3,998,296 a caliper assembly supports an outer shoe by means of gripping flanges on the outer shoe in engagement with surfaces machined on the caliper housing. In view of the double location for the gripping flanges, the caliper housing requires machining at several locations to permit attachment of the outer shoe thereto.

The present invention is characterized by one of said pair of grooves including a slot and one of said pair of friction elements is received within said slot and disposed in abutting relation with the wall of said one groove in order to attach said one friction element to said caliper assembly.

It is an advantage of the present invention that a groove required on the caliper assembly for slidably supporting the latter is utilized to support a friction element and the groove is slotted to permit ready engagement of the friction element to the caliper assembly.

The inventions will now be described with reference to the accompanying drawings wherein.

Figure 1:
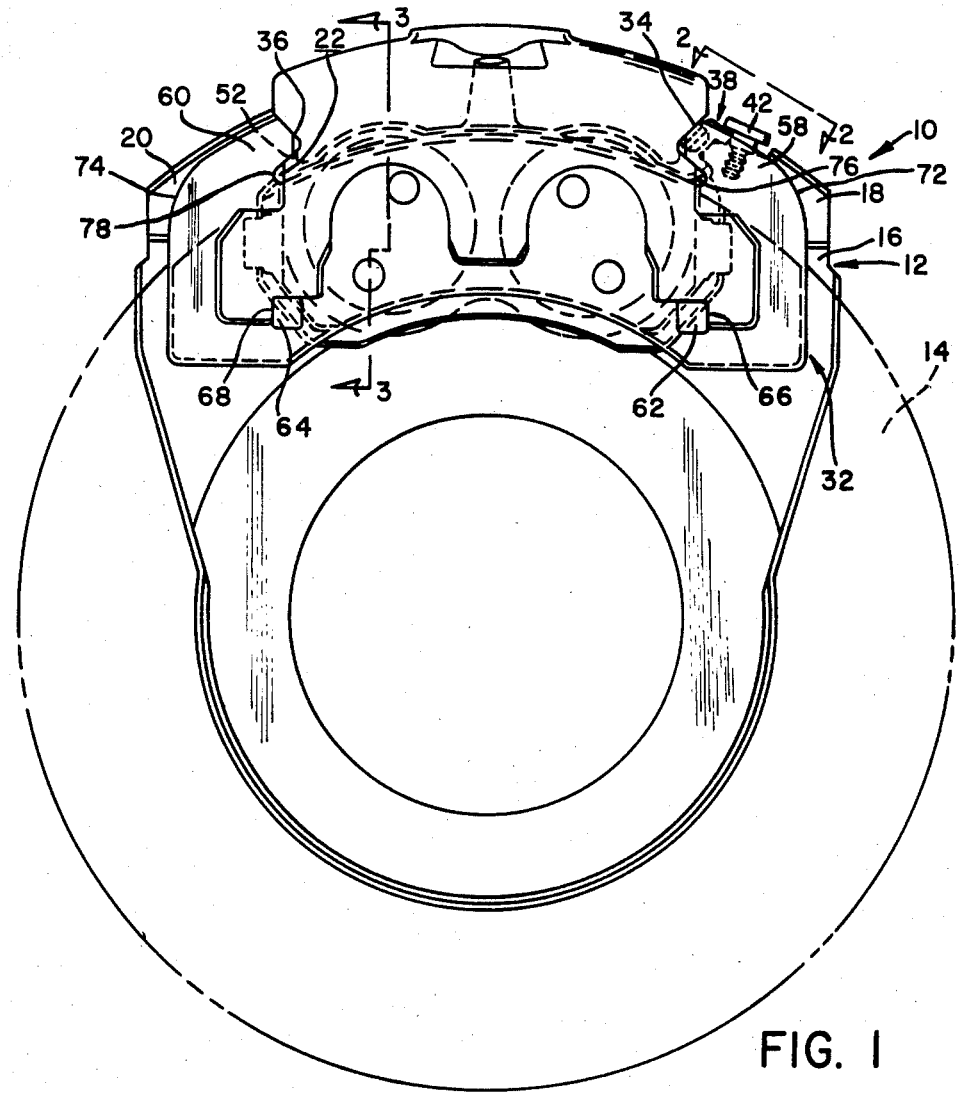
FIG. 1 is a side view of a disc brake assembly constructed in accordance with the present invention.

In a disc brake assembly 10 a torque member 12 is fixedly disposed adjacent a rotor 14. The torque member 12 includes a first portion 16 extending parallel to the rotor 14 and a pair of arms 18 and 20 extend from the first portion 16 over the periphery of the rotor 14 in a normal direction. The torque member defines a circumferentially extending recess 22 for receiving a caliper assembly 24. The caliper assembly carried a hydraulic actuator 26 on one side of the rotor 14 and extends to the other side of the rotor to include a reaction leg 28. during braking the hydraulic actuator 26 receives fluid pressure to directly urge an inner friction element 30 into engagement with the rotor 14. A reaction force generated by the friction element 30 biases the caliper assembly 24 to move an outer friction element 32 into engagement with the rotor 14.

The caliper assembly 24 defines a pair of recesses or grooves 34 and 36 extending axially from the hydraulic actuator 26 to the reaction leg 28. The recesses 34 and 36 are substantially V shaped with a radially outer surface and a radially inner surface. The recess 34 receives the torque member arm 18 and the recess 36 receives the torque member arm 20. In order to accommodate manufacturing tolerances and assist in movably supporting the caliper assembly 24 relative to the torque member 12, the arm 18 includes a key assembly 38 comprising a plate 40 secured via bolt 42 to the arm 18 and a leaf spring 44 carried within a plate groove 46 to slidably engage the outer surface of recess 34.

Figure 2:
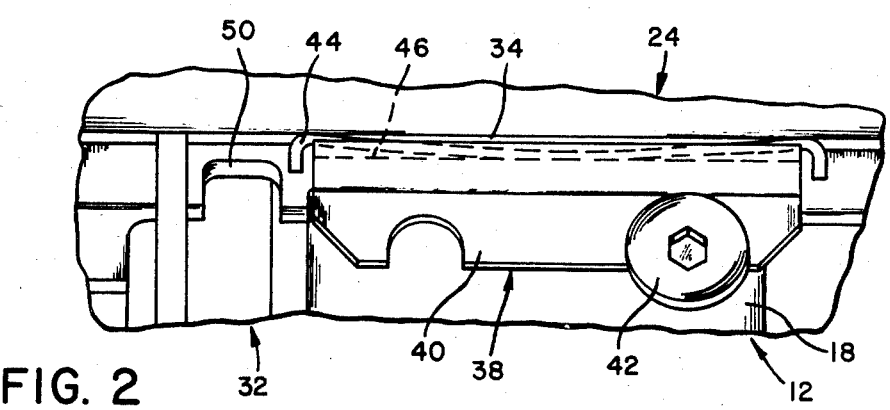
FIG. 2 is a view taken along line 2—2 of FIG. 1.
Figure 3:
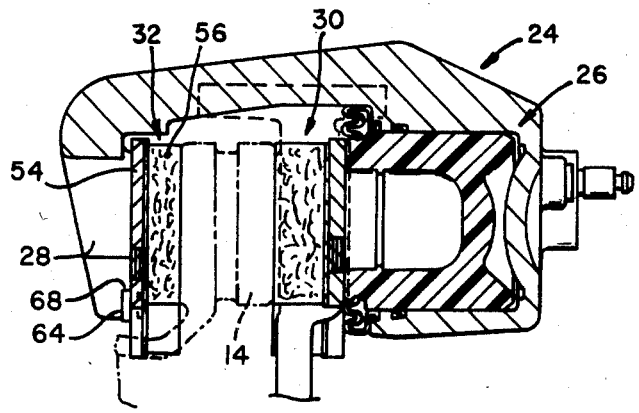
FIG. 3 is a cross-sectional view taken along line 3—3 of FIG. 1.
Figure 4:
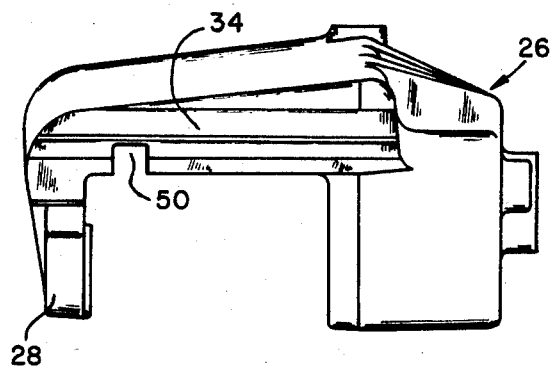
FIG. 4 is a right side view of FIG. 1 showing only the caliper assembly.

In accordance with the invention, the axially extending recesses 34 and 36 are provided with slots 50 and 52, slot 50 being more clearly illustrated in FIGS. 2 and 4. The outer friction element 32 includes a backing plate 54 which carries a friction pad 56 engageable with the rotor 14. The backing plate includes a pair of ears 58 and 60 which extend radially outwardly past the friction pad and circumferentially toward each other. The ears 58 and 60 fit into the slots 50 and 52, respectively, to engage the surfaces of the recesses 34 and 36. The slots 50 and 52 are adjacent but slightly spaced from the leg 28 to permit the ears to move within the recesses to abut the backing plate 54 with the leg 28 and space the ears from the slots. Also, the backing plate 54 is provided with a pair of projections 62 and 64 and the leg 28 is provided with a pair of steps 66 and 68 so that when the friction element 32 is moved into engagement with the leg 28, the projection 62 and 64 fit into the steps to abut the surfaces of the steps. Consequently, the ears 58 and 60 cooperate with the recesses 34 and 36 and the projections 62 and 64 cooperate with the steps 66 and 68 to connect the outer friction element with the caliper assembly.

The inner friction element 30 is carried by the torque member 12 in a conventional manner so that braking torque developed by the inner friction element is transmitted directly to the torque member while braking torque developed by the outer friction element is transmitted to the caliper assembly. In particular, if arm 18 is the leading arm, the backing plate ear 58 will be forced into abutting engagement with the outer surface of recess 34 and the backing plate projection 64 will be forced into abutting engagement with the verticle surface of step 68. Consequently, the braking torque transmitted to the caliper assembly is split between a leading portion of the caliper assembly at recess 34 and a trailing portion of the caliper assembly at step 68. The leading portion is in radial alignment with the arms 18 and 20 and the trailing portion is substantially located at the radially inner edge of the leg 28.

Figure 5:
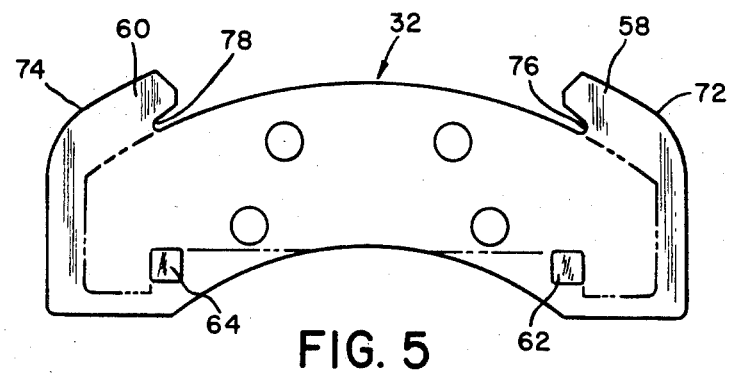
FIG. 5 is a front view of FIG. 1 showing only the outer friction element.

Turning to FIG. 5, the outer friction element 32 vertically aligns the pair of projections 62 and 64 with the pair of ears 58 and 60. In order to align these parts, the ears 58 and 60 include arcuate edges 72 and 74 which align radially with the arms 18 and 20, respectively when the outer friction element 32 is attached to the caliper assembly. The arms define cut outs 76 and 78 which receive the radially inner surface portions of the caliper assembly defining the recesses 34 and 36. The outer friction element backing plate 54 defines a flat profile except for the pair of projections 62 and 64 which are formed in a rectangular shape for engagement with two surfaces of each step. The outer friction element backing plate 54 and friction pad 56 define a transverse width which is larger than a transverse width for the reaction leg 28. For this reason the pair of ears 58 and 60 extend inwardly toward each other to fit into the pair of recesses 34 and 36, respectively, and the arcuate edges 72 and 74 approach an outer edge of the torque member arms 18 and 20, respectively.

Viewing FIG. 2, when the outer friction element 32 is worn, the caliper assembly 24 moves relative to the torque member to an adjusted position. In the adjusted position the arm 18 overlaps the slot 50 and the arm 20 overlaps the slot 52. Therefore, replacement of the work outer friction element requires that the caliper assembly be returned to its original position to permit the outer friction element to be withdrawn from the recesses 34 and 36 via slots 50 and 52. However, as the outer friction element 32 is worn, it is trapped in its attached position to prevent unexpected dissassembly via the slots 50 and 52, which are covered by the arms.

In conclusion, there are many modifications and/or variations of the structure described herein which are feasible by one skilled in the art. As such, these modifications and/or variations are included in the scope of the appended claims.

We claim:

1. A disc brake assembly comprising a torque member fixedly disposed adjacent a rotor to be braked and including a pair of arms extending axially over the periphery of the rotor, a caliper assembly movably carried by the pair of arms and cooperating with an inner friction element and an outer friction element to urge the elements into engagement with the rotor during braking, and the caliper assembly including a pair of axially extending grooves for receiving the pair of arms, each one of said pair of grooves including a slot and said outer friction element including ears received through said slot and disposed in interlocking relation with the walls of said grooves to attach said outer friction element to said caliper assembly, said inner friction element being carried by said torque member in spaced relation to said pair of axially extending grooves, said caliper assembly carrying a hydraulic actuator on one side of said rotor adjacent said inner friction element, said caliper assembly including a reaction leg extending radially on the other side of said rotor adjacent said outer friction element, said slots intersecting said grooves at points disposed in spaced proximal relationship to said reaction leg, said caliper assembly being movable relative to said torque member in response to wear of said pair of friction elements and said pair of arms overlapping said slots when said pair of friction elements are worn a predetermined amount, and said ears being complementary to and extending, respectively, into said grooves and said ears being provided with substantially arcuate outer edges in alignment with said torque member arms when said outer friction element is attached to said caliper assembly.

2. In a disc brake assembly, the combination of a torque member with a pair of arms extending axially over a rotor to be braked, a caliper cooperating with an inner friction element and an outer friction element to engage both elements with the rotor, the caliper defining a pair of axially extending grooves having slot means therein, the pair of arms extending into and slidably engaging the pair of grooves, respectively, the caliper including an actuator opposing the inner friction element and a reaction leg opposing the outer friction element, the outer friction element defining a pair of ears complementary to and extending through said slot means into the pair of grooves, respectively, for interlocking connection with the caliper, the outer friction element comprising a friction pad engagable with the rotor and a backing plate, the backing plate defining a flat profile except for a pair of rectangular projections in lateral abutment with the caliper reaction leg, the backing plate and the friction pad defining a transverse width which is larger than a transverse width for the reaction leg, and the pair of ears extend from transverse extremities toward each other with arcuate edges in alignment with the pair of torque member arms so that the pair of ears are similar in shape to the portion of said arms received in the pair of said grooves and said arms overlap said slot means when said friction elements are worn.

* * * * *